(12) United States Patent
Wenderoth et al.

(10) Patent No.: US 7,419,618 B2
(45) Date of Patent: Sep. 2, 2008

(54) COOLANT COMPRISING AZOLE DERIVATIVES FOR COOLING SYSTEMS IN FUEL-CELL DRIVES

(75) Inventors: Bernd Wenderoth, Birkenau (DE); Stefan Dambach, Haβloch (DE); Ladislaus Meszaros, Mutterstadt (DE); Uwe Fidorra, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 244 days.

(21) Appl. No.: 11/448,737

(22) Filed: Jun. 8, 2006

(65) Prior Publication Data

US 2006/0219975 A1    Oct. 5, 2006

Related U.S. Application Data

(62) Division of application No. 11/253,754, filed on Oct. 20, 2005, which is a division of application No. 10/477,463, filed on Nov. 12, 2003, now Pat. No. 7,371,334.

(51) Int. Cl.
*C09K 5/00* (2006.01)
*H01M 8/18* (2006.01)

(52) U.S. Cl. .............................. 252/71; 252/73; 252/75; 429/20; 429/26; 429/120

(58) Field of Classification Search ........................ None
See application file for complete search history.

(56) References Cited

U.S. PATENT DOCUMENTS

| | | | |
|---|---|---|---|
| 4,460,478 A | 7/1984 | Mohr et al. | |
| 4,676,919 A | 6/1987 | Zientek | |
| 4,684,475 A | 8/1987 | Matulewicz | |
| 4,781,435 A | 11/1988 | Lippmann et al. | |
| 4,925,294 A | 5/1990 | Geshwind et al. | |
| 5,000,866 A | 3/1991 | Woyciesjes | |
| 5,510,832 A | 4/1996 | Garcia | |
| 5,673,081 A | 9/1997 | Yamashita et al. | |
| 5,682,437 A | 10/1997 | Okino et al. | |
| 5,717,415 A | 2/1998 | Iue et al. | |
| 5,739,844 A | 4/1998 | Kuwano et al. | |
| 5,777,666 A | 7/1998 | Tanase et al. | |
| 5,808,664 A | 9/1998 | Yamashita et al. | |
| 5,953,054 A | 9/1999 | Mercier | |
| 5,969,766 A | 10/1999 | Kim | |
| 6,108,005 A | 8/2000 | Starks et al. | |
| 6,215,516 B1 | 4/2001 | Ma et al. | |
| 6,215,590 B1 | 4/2001 | Okano | |
| 6,314,211 B1 | 11/2001 | Kim et al. | |
| 6,377,625 B1 | 4/2002 | Kim | |
| 6,392,689 B1 | 5/2002 | Dolgoff | |
| 6,432,320 B1 * | 8/2002 | Bonsignore et al. | ........... 252/70 |
| 6,456,432 B1 | 9/2002 | Lazzaro et al. | |
| 6,496,598 B1 | 12/2002 | Harman | |
| 6,680,138 B1 | 1/2004 | Honma et al. | |
| 2002/0122585 A1 | 9/2002 | Swift et al. | |
| 2002/0126202 A1 | 9/2002 | Wood et al. | |
| 2002/0191841 A1 | 12/2002 | Harman | |
| 2004/0028971 A1 | 2/2004 | Wenderoth et al. | |

FOREIGN PATENT DOCUMENTS

| | | |
|---|---|---|
| DE | 3530601 | 3/1987 |
| DE | 198 02 490 | 7/1999 |
| DE | 199 55 704 | 5/2001 |
| DE | A 100 63 951 | 6/2002 |
| EP | 0 105 803 A1 | 4/1984 |
| EP | 0520179 | 12/1992 |
| EP | 0 665 697 A2 | 8/1995 |
| EP | 0 714 077 A2 | 5/1996 |
| EP | 1 009 050 A2 | 12/1999 |
| WO | WO 99/03068 | 1/1999 |
| WO | WO 99/12127 | 3/1999 |
| WO | WO 00/17951 | 3/2000 |
| WO | WO 01/23495 | 4/2001 |
| WO | WO 01/76258 | 4/2001 |

OTHER PUBLICATIONS

Derwent Abstract 1999-420101/36, Frost-protected fuel cell, e.g., polymer electrolyte membrane fuel cell for vehicles, Jan. 23, 1998.
G. Reinhard et al, "Aktiver Korrosionsschutz in wäβrigen Medien", S. 87-98, expert-Verlag 1995 (ISBN 3-8169-1265-6).
Conversion System of Monocular Image Sequence to Stereo Using Motion Parallax, SPIE vol. 3012.
Huang, T.S.: Image Sequence Analysis, Springer-Verlag, 1981, pp. 311-315, 338.
International Search Report for International Application No. PCT/EP01/13674 filed Nov. 24, 2001.

* cited by examiner

*Primary Examiner*—Necholus Ogden
(74) *Attorney, Agent, or Firm*—Nixon & Vanderhye P.C.

(57) ABSTRACT

An antifreeze concentrate for cooling systems in fuel-cell drives which gives ready-to-use aqueous coolant compositions having a conductivity of at most 50 μS/cm, based on alkylene glycols or derivatives thereof and containing one or more five-membered heterocyclic compounds (azole derivatives) having 2 or 3 hetero atoms from the group consisting of nitrogen and sulfur, which contain no or at most one sulfur atom and which may carry a fused aromatic or saturated six-membered ring.

7 Claims, No Drawings

COOLANT COMPRISING AZOLE DERIVATIVES FOR COOLING SYSTEMS IN FUEL-CELL DRIVES

CROSS-REFERENCE TO RELATED APPLICATION

This application is a divisional of commonly owned U.S. application Ser. No. 11/253,754 filed on Oct. 20, 2005, which is a divisional of commonly owned U.S. application Ser. No. 10/477,463 filed Nov. 12, 2003 (now U.S. Pat. No. 7,371,334) the entire content of which is expressly incorporated hereinto by reference.

The present invention relates to coolants for cooling systems in fuel-cell drives, in particular for motor vehicles, based on alkylene glycols or derivatives thereof, which comprise specific azole derivatives as corrosion inhibitors.

Fuel cells for mobile use in motor vehicles have to be capable of operation even at low outside temperatures of down to about −40° C. A freezing-protected coolant circuit is therefore vital.

The use of the conventional radiator protection compositions employed in internal-combustion engines would be impossible in fuel cells without complete electrical insulation of the cooling channels, since these compositions, owing to the salts and ionizable compounds present therein as corrosion inhibitors, have high electrical conductivity, which would adversely affect the function of the fuel cell.

DE-A 198 02 490 (1) describes fuel cells having a freezing-protected cooling circuit in which the coolant used is a paraffinic isomer mixture having a pour point of below −40° C. However, the combustibility of a coolant of this type is disadvantageous.

EP-A 1 009 050 (2) discloses a fuel-cell system for automobiles in which the cooling medium used is air. However, it is disadvantageous here that air, as is known, is a poorer thermal conductor than a liquid cooling medium.

WO 00/17951 (3) describes a cooling system for fuel cells in which the coolant employed is a pure monoethylene glycol/water mixture in the ratio 1:1 without additives. Since, owing to the lack of corrosion inhibitors, absolutely no corrosion protection would be present against the metals present in the cooling system, the cooling circuit contains an ion exchanger unit in order to maintain the purity of the coolant and to ensure a low specific conductivity for an extended time, preventing short-circuits and corrosion. Suitable ion exchangers mentioned are anionic resins, for example of the strongly alkaline hydroxyl type, and cationic resins, for example based on sulfonic acid groups, and other filtration units, for example activated carbon filters.

The construction and mode of functioning of a fuel cell for automobiles, in particular a fuel cell having an electron-conducting electrolyte membrane ("PEM fuel cell", "polymer electrolyte membrane fuel cell") is described by way of example in (3), the preferred metal component in the cooling circuit (radiator) being aluminum.

DE-A 100 63 951 (4) describes coolants for cooling systems in fuel-cell drives which comprise orthosilicates as corrosion inhibitors.

The use of azole derivatives, such as benzimidazole, benzotriazole or tolutriazole, as corrosion inhibitors in radiation protection compositions for conventional internal-combustion engines operated with gasoline or diesel fuel has been known for some time, for example from: G. Reinhard et al., "Aktiver Korrosionsschutz in wäβrigen Medien", pp. 87-98, expert-Verlag 1995 (ISBN 3-8169-1265-6).

The use of azole derivatives of this type in coolants for cooling systems in fuel-cell drives has not been disclosed hitherto.

The main problem in cooling systems in fuel-cell drives is the maintenance of a low electrical conductivity of the coolant in order to ensure safe and fault-free functioning of the fuel cell and to prevent short circuits and corrosion in the long term.

Surprisingly, it has now been found that the time duration for low electrical conductivity in a cooling system based on alkylene glycol/water, also and in particular if it contains an integrated ion exchanger in accordance with (3), can be significantly extended by the addition of small amounts of azole derivatives. This offers the practical advantage that the time intervals between two coolant changes in fuel-cell drives can be extended further, which is of particular interest in the automobile sector.

Accordingly, we have found antifreeze concentrates for cooling systems in fuel-cell drives which give ready-to-use aqueous coolant compositions having a conductivity of at most 50 μS/cm, based on alkylene glycols or derivatives thereof, which comprise one or more five-membered heterocyclic compounds (azole derivatives) having 2 or 3 heteroatoms from the group consisting of nitrogen and sulfur, which contain no or at most one sulfur atom and which may carry a fused aromatic or saturated six-membered ring. Preference is given here to antifreeze concentrates which comprise a total of from 0.05 to 5% by weight, in particular from 0.075 to 2.5% by weight, especially from 0.1 to 1% by weight, of said azole derivatives.

These five-membered heterocyclic compounds (azole derivatives) usually contain, as heteroatoms, two N atoms and no S atom, 3 N atoms and no S atom or one N atom and one S atom.

Preferred groups of said azole derivatives are fused imidazoles and fused 1,2,3-triazoles of the general formula (I) or (II)

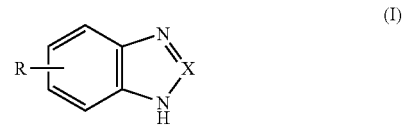

(I)

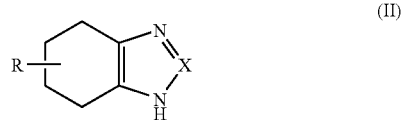

(II)

where the variable R is hydrogen or a $C_1$- to $C_{10}$-alkyl radical, in particular methyl or ethyl, and the variable X is a nitrogen atom or the C—H group. Typical examples of azole derivatives of the general formula (I) are benzimidazole (X=C—H, R=H), benzotriazole (X=N, R=H) and tolutriazole (tolyltriazole) (X=N, R=CH$_3$). A typical example of an azole derivative of the general formula (II) is hydrogenated 1,2,3-tolutriazole (tolyltriazole) (X=N, R=CH$_3$).

A further preferred group of said azole derivatives comprises benzothiazoles of the general formula (III)

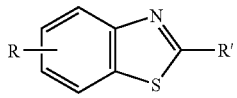

(III)

where the variable R is as defined above, and the variable R' is hydrogen, a $C_1$- to $C_{10}$-alkyl radical, in particular methyl or ethyl, or in particular the mercapto group (—SH). A typical example of an azole derivative of the general formula (III) is 2-mercaptobenzothiazole.

Preference is furthermore given to non-fused azole derivatives of the general formula (IV)

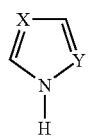

(IV)

where the variables X and Y together are two nitrogen atoms or one nitrogen atom and one C—H group, for example 1H-1,2,4-triazole (X=Y=N) or imidazole (X=N, Y=C—H).

Very particularly preferred azole derivatives for the present invention are benzimidazole, benzotriazole, tolutriazole, hydrogenated tolutriazole or mixtures thereof.

Said azole derivatives are commercially available or can be prepared by common methods. Hydrogenated benzotriazoles and hydrogenated tolutriazole are likewise accessible in accordance with DE-A 1 948 794 (5) and are also commercially available.

Besides said azole derivatives, the antifreeze concentrates according to the invention preferably additionally comprise orthosilicates, as described in (4). Typical examples of orthosilicates of this type are tetraalkoxysilanes, such as tetraethoxysilane. Preference is given here to antifreeze concentrates, in particular those having a total content of from 0.05 to 5% by weight of said azole derivatives, which give ready-to-use aqueous coolant compositions having a silicon content of from 2 to 2000 ppm by weight of silicon, in particular from 25 to 500 ppm by weight of silicon.

Dilution of the antifreeze concentrates according to the invention with ion-free water gives ready-to-use aqueous coolant compositions having a conductivity of at most 50 µS/cm and which essentially consist of
  (a) from 10 to 90% by weight of alkylene glycols or derivatives thereof,
  (b) from 90 to 10% by weight of water,
  (c) from 0.005 to 5% by weight, in particular from 0.0075 to 2.5% by weight, especially from 0.01 to 1% by weight, of said azole derivatives, and
  (d) if desired orthosilicates.
The sum of all components here is 100% by weight.

The present invention thus also relates to ready-to-use aqueous coolant compositions for cooling systems in fuel-cell drives which essentially consist of
  (a) from 10 to 90% by weight of alkylene glycols or derivatives thereof,
  (b) from 90 to 10% by weight of water,
  (c) from 0.005 to 5% by weight, in particular from 0.0075 to 2.5% by weight, especially from 0.01 to 1% by weight, of said azole derivatives, and
  (d) if desired orthosilicates.

and which are obtainable by dilution of said antifreeze concentrates with ion-free water. The sum of all components here is 100% by weight.

The ready-to-use aqueous coolant compositions according to the invention have an initial electrical conductivity of at most 50 µS/cm, in particular 25 µS/cm, preferably 10 µS/cm, especially 5 µS/cm. The conductivity is kept at this low level in long-term operation of the fuel-cell drive over a number of weeks or months, in particular if a cooling system with integrated ion exchanger is used in the fuel-cell drive.

The pH of the ready-to-use aqueous coolant compositions according to the invention drops significantly more slowly over the operating time than in the case of cooling fluids to which said azole derivatives have not been added. The pH is usually in the range from 4.5 to 7 in the case of fresh coolant compositions according to the invention and usually drops to 3.5 in long-term operation. The ion-free water used for the dilution may be pure distilled or bidistilled water or water that has been deionized by, for example, ion exchange.

The preferred mixing ratio by weight between the alkylene glycol or derivatives thereof and water in the ready-to-use aqueous coolant compositions is from 20:80 to 80:20, in particular from 25:75 to 75:25, preferably from 65:35 to 35:65, especially from 60:40 to 40:60. The alkylene glycol component or derivatives thereof which can be used here is, in particular, monoethylene glycol, but also monopropylene glycol, polyglycols, glycol ethers or glycerol, in each case alone or in the form of mixtures thereof. Particular preference is given to monoethylene glycol alone or mixtures of monoethylene glycol as the principal component, i.e. with a content in the mixture of greater than 50% by weight, in particular greater than 80% by weight, especially greater than 95% by weight, with other alkylene glycols or derivatives of alkylene glycols.

The antifreeze concentrates according to the invention which give the ready-to-use aqueous coolant compositions described can themselves be prepared by dissolving said azole derivatives in alkylene glycols or derivatives thereof which are water-free or have a low water content (for example up to 10% by weight, in particular up to 5% by weight).

The present invention also relates to the use of five-membered heterocyclic compounds (azole derivatives) having 2 or 3 hetero atoms from the group consisting of nitrogen and sulfur, which contain no or at most one sulfur atom and which may carry a fused aromatic or saturated six-membered ring for the preparation of antifreeze concentrates for cooling systems in fuel-cell drives, in particular for motor vehicles, based on alkylene glycols and derivatives thereof.

The present invention furthermore relates to the use of these antifreeze concentrates for the preparation of ready-to-use aqueous coolant compositions having a conductivity of at most 50 µS/cm for cooling systems in fuel-cell drives, in particular for motor vehicles.

The coolant compositions according to the invention may also be employed in a fuel-cell unit as described in DE-A 101 04 771 (6), in which the cooling medium is additionally electrochemically deionized in order to prevent corrosion.

EXAMPLES

The invention is explained in the following examples, but without being restricted thereto.

In the test described below, the coolant compositions according to the invention were tested for their suitability for fuel-cell drives in comparison with a coolant composition as described in (3):

the beginning of the test and at intervals of several weeks on a liquid sample taken in advance (LF 530 conductivity meter from WTW/Weilheim). After completion of the test, the aluminum samples were assessed visually and, after pickling with aqueous chromic acid/phosphoric acid, evaluated gravimetrically in accordance with ASTM D 1384-94.

The results are shown in Tables 1 and 2.

TABLE 1

Experiments in the presence of ion exchanger

| Coolant composition: | Comparative Example (acc. to WO 00/17951): 60 vol.-% MEG 40 vol.-% water | Example 1: 60 vol.-% MEG 40 vol.-% water 0.1% by wt. benzimidazole | Example 2: 60 vol.-% MEG 40 vol.-% water 0.1% by wt. benzotriazole | Example 3: 60 vol.-% MEG 40 vol.-% water 0.1% by wt. tolutriazole | Example 4: 60 vol.-% MEG 40 vol.-% water 0.1% by wt. hydrogenated tolutriazole | Example 5: 60 vol.-% MEG 40 vol.-% water 0.05% by wt. benzotriazole 371 ppm by wt. tetraethoxysilane |
|---|---|---|---|---|---|---|
| Electrical conductivity [mS/cm0] | | | | | | |
| Beginning of test: | 2.0 | 4.9 | 3.3 | 3.1 | 1.1 | 1.9 |
| after 7 days: | 2.3 | 4.2 | 1.5 | 1.5 | 0.8 | 1.5 |
| after 35 days: | — | 7.6 | 4.1 | 10.2 | — | 2.5 |
| after 42 days: | 36.2 | — | 3.9 | — | 3.5 | 3.3 |
| after 56 days: | — | — | 7.8 | — | — | 5.5 |
| pH | | | | | | |
| Beginning of test: | 6.9 | 7.5 | 5.0 | 5.5 | 6.6 | 5.5 |
| End of test: | 2.9 | 6.5 | 3.8 | 3.9 | 4.0 | 3.7 |
| Appearance of aluminum samples after the test: | slightly tarnished | tarnished | tarnished | tarnished | tarnished | tarnished |
| Weight change [mg/cm$^2$] after pickling: | | | | | | |
| 1 | −0.05 | −0.07 | −0.06 | −0.01 | −0.04 | −0.03 |
| 2 | −0.04 | −0.06 | −0.06 | −0.01 | −0.05 | −0.04 |
| 3 | −0.04 | −0.06 | −0.06 | −0.01 | −0.05 | −0.02 |
| 4 | −0.04 | −0.06 | −0.06 | −0.01 | −0.05 | −0.03 |
| 5 | −0.03 | −0.07 | −0.06 | −0.01 | −0.05 | −0.03 |
| Mean of the samples | −0.04 | −0.06 | −0.06 | −0.01 | −0.05 | −0.03 |
| Solution at end of test | yellowish, clear | brownish, clear | colorless, clear | colorless, clear | colorless, clear | colorless, clear |

Description of the Experiment

Five aluminum test metals (vacuum-soldered Al, name: EN-AW 3005, solder-plated on one side with 10% by weight of EN-AW 4045; dimensions: 58×26×0.35 mm with a hole having a diameter of 7 mm) were weighed, connected in a non-conductive manner by means of a plastic screw with washer and Teflon disks and placed on two Teflon stands in a 1 l beaker with ground-glass joint and glass lid. 1000 ml of test liquid were subsequently introduced. In the experiments shown in Table 1 below, a small fabric sack containing 2.5 g of an ion exchanger (AMBERJET® UP 6040 RESIN mixed bed resin ion exchanger from Rohm+Haas) was suspended in the liquid, and the examples in Table 2 shown below were carried out without the presence of an ion exchanger. The beaker was sealed in an air-tight manner with the glass lid and heated to 88° C., and the liquid was stirred vigorously using a magnetic stirrer. The electrical conductivity was measured at In the mixture of monoethylene glycol (=MEG) and water, the volume ratio of 60:40 corresponds to a weight ratio of 62.5:37.5.

In Example 5 according to the invention, the orthosilicate was metered in so that a silicon content of 50 ppm by weight was present in the cooling liquid.

The results in Table 1 show that a very low electrical conductivity of less than 4 μS/cm was present even after an uninterrupted experiment duration of 42 days in Examples 2 and 4 in accordance with the invention, while, with an increase to virtually 40 μS/cm, a significant impairment had occurred in the coolant with no additives in accordance with WO 00/17951 (3). Even after an uninterrupted experiment duration of 56 days, the electrical conductivity was in some cases still significantly below 8 μS/cm in Examples 2 and 5 in accordance with the invention.

In no case did significant corrosion on the aluminum samples occur.

TABLE 2

Experiments without ion exchanger

| Coolant composition: | Example 1: 60 vol.-% MEG 40 vol.-% water 0.1% by wt. benzotriazole | Example 2: 60 vol.-% MEG 40 vol.-% water 0.1% by wt. benzotriazole 742 ppm by wt. tetraethoxysilane | Example 3: 60 vol.-% MEG 40 vol.-% water 0.1% by wt. hydrogenated tolutriazole |
|---|---|---|---|
| Electrical conductivity [µS/cm] | | | |
| Beginning of test: | 3.2 | 3.2 | 2.1 |
| after 7 days: | 5.0 | 5.6 | |
| after 14 days: | 5.8 | 5.2 | 5.8 |
| after 28 days: | 8.2 | 6.9 | |
| after 35 days: | 11.2 | 6.9 | 8.6 |
| after 42 days: | 13.1 | 7.9 | 9.3 |
| after 49 days: | 16.1 | 7.6 | 9.7 |
| after 56 days: | — | 7.8 | |
| after 63 days: | — | 7.1 | |
| after 77 days: | — | 6.6 | 17.5 |
| pH | | | |
| Beginning of test: | 5.0 | 5.0 | 5.2 |
| End of test: | 3.6 | 4.9 | 3.4 |
| Appearance of aluminum samples after the test: | almost unchanged | almost unchanged | tarnished |
| Weight change [mg/cm$^2$] after pickling: | | | |
| 1 | −0.01 | 0.00 | −0.02 |
| 2 | 0.00 | 0.00 | −0.02 |
| 3 | 0.00 | 0.00 | −0.04 |
| 4 | 0.00 | 0.00 | −0.04 |
| 5 | 0.00 | 0.00 | −0.04 |
| Mean of the samples | 0.00 | 0.00 | −0.03 |
| Solution at end of test | colorless, clear | colorless, clear | colorless, clear |

In the mixture of monoethylene glycol (=MEG) and water, the volume ratio of 60:40 corresponds to a weight ratio of 62.5:37.5.

In Example 2 according to the invention, the orthosilicate was metered in such that a silicon content of 100 ppm by weight was present in the cooling liquid.

The results from Table 2 show that a very low electrical conductivity of significantly less than 10 µS/cm was present even after an uninterrupted experiment duration of 77 days in Example 2 in accordance with the invention; the electrical conductivity after 77 days was again significantly below 20 µS/cm in Example 3 in accordance with the invention.

In these experiments too, no or no significant corrosion occurred on the aluminum samples.

The invention claimed is:

1. A ready-to-use aqueous fuel cell coolant composition having an initial conductivity of at most 50 µS/cm and which consists essentially of
    (a) from 10 to 90% by weight of alkylene glycols or derivatives thereof,
    (b) from 90 to 10% by weight of water,
    (c) from 0.005 to 5% by weight of an azole derivative, and
    (d) orthosilicates in an amount to provide the aqueous coolant composition with a silicon content of from 2 to 2000 ppm by weight, wherein
    the azole derivative consists of one or more five-membered heterocyclic compounds having 2 or 3 heteroatoms selected from the group consisting of nitrogen and sulfur, which contain no or at most one sulfur atom and which may carry a fused aromatic or saturated six-membered ring.

2. A fuel cell cooling system comprising an aqueous fuel cell coolant composition having an initial electrical conductivity of at most 50 µS/cm, wherein said fuel cell coolant composition consists essentially of an alkylene glycol and water solution, and an azole derivative additive consisting of one or more five-membered heterocyclic compounds having 2 or 3 heteroatoms selected from the group consisting of nitrogen and sulfur, which contain no or at most one sulfur atom and which may carry a fused aromatic or saturated six-membered ring, and an orthosilicate in an amount to provide a silicon content of from 2 to 2000 ppm by weight.

3. The fuel cell cooling system as claimed in claim 1, wherein the coolant composition consists essentially of from 0.05 to 5% by weight of the azole derivatives.

4. The fuel cell cooling system as claimed in claim 1, wherein the azole derivative is benzimidazole, benzotriazole, tolutriazole and/or hydrogenated tolutriazole.

5. The fuel cell cooling system as claimed in claim 2, wherein the azole derivative is benzimidazole, benzotriazole, tolutriazole and/or hydrogenated tolutriazole.

6. The fuel cell cooling system as claimed in claim 1, in which the alkylene glycol is monoethylene glycol.

7. A fuel cell cooling system comprising an aqueous coolant composition having an initial conductivity of at most 50 µS/cm and which consists essentially of
    (a) from 10 to 90% by weight of alkylene glycols or derivatives thereof,
    (b) from 90 to 10% by weight of water,
    (c) from 0.005 to 5% by weight of an azole derivative, and
    (d) orthosilicates in an amount which gives a ready-to-use aqueous coolant composition having a silicon content of from 2 to 2000 ppm by weight, wherein
    the azole derivative consists of one or more five-membered heterocyclic compounds having 2 or 3 heteroatoms selected from the group consisting of nitrogen and sulfur, which contain no or at most one sulfur atom and which may carry a fused aromatic or saturated six-membered ring.

* * * * *